Patented June 19, 1951

2,557,257

UNITED STATES PATENT OFFICE 2,557,257

EXTRACTIVE FRACTIONATION PROCESS

Richard E. Melrose, Los Angeles, Calif., assignor to Shell Development Company, San Francisco, Calif., a corporation of Delaware No Drawing. Application January 29, 1949,
Serial No. 73,657

14 Claims. (Cl. 260—676)

This invention relates to a process for the fractionation of mixtures of organic compounds. More particularly, it is concerned with the separation of straight chain organic compounds from their mixtures with branched chain and/or cyclic organic compounds.

The fractionation of mixtures of organic compounds is ordinarily effected by application of well known processes such as fractional distillation, steam distillation, extractive distillation, solvent extraction, fractional crystallization and so on. In many cases these processes are satisfactory for the result desired, but the separation of mixtures of closely similar compounds into component fractions is often difficult or impossible. Specifically, it has been found that the separation of mixtures of petroleum hydrocarbons according to structural configuration is especially difficult when the components of the mixture have substantially identical or similar boiling points. The fractionation of petroleum distillates according to structural type is especially desirable for the preparation of improved fractions having high octane number, low freezing point or with some especially preferred characteristic.

A relatively recent process, which will be explained in detail hereinafter, is based upon the observation that urea is capable of forming crystalline molecular complexes with straight chain organic compounds. At the same time, it has been noted that branched chain materials and cyclic organic compounds are substantially inert in this respect. Hence, it is possible to treat a mixture of straight chain organic compounds containing other materials which do not have a straight chain configuration with urea and separate from the mixture a crystalline product comprising straight chain fractions of the mixture in molecular combination with urea.

When the mixture of organic compounds is being treated with an aqueous urea solution for this purpose, it has been found that a serious problem arises due to the emulsifying tendencies between the aqueous urea phase and the immiscible organic phase containing the mixture.

It is an object of the present invention to improve the urea fractionation process. It is another object of this invention to suppress the emulsifying tendencies of a urea fractionation reaction mixture. It is a further object of this invention to provide an improvement in the urea fractionation process for the purpose of the production of fractions having an improved degree of purity. It is a particular purpose to suppress emulsification in the separation stages following complex formation. Other objects will become apparent during the following discussion.

Now, in accordance with the present invention, it has been found that the emulsifying tendency exhibited during the urea fractionation process between an oleophilic phase and an aqueous urea phase may be substantially suppressed by the presence of an effective amount of at least one water-soluble salt of three particular classes, namely, nitrites, chromates and iodates.

The basic process

The urea fractionation process essentially comprises contacting urea with a mixture of organic compounds, allowing crystalline molecular complexes to form between urea and straight chain components of the organic mixture, separating the unreacted components of the reaction mixture from the crystalline complexes and regenerating the straight chain organic compounds from the crystals.

The process is preferably carried out at a temperature between about 0° C. and 75° C., although higher temperatures may be used, depending on the particular stock to be treated and objectives to be accomplished. It is a preferred embodiment of the process to control the temperature and pressure conditions so that the mixture of organic compounds is fluid while in contact with urea. The process is facilitated by the use of diluents for the mixture of organic compounds and by the use of an aqueous solvent for urea. Preferably, the mixture of organic compounds is contained in an oleophilic solvent unless it is sufficiently fluid and water-immiscible without this modification.

The fluid organic compound mixture and the aqueous solution of urea are preferably passed into a reactor, e. g., mixing tower, at such a rate that any crystalline complexes which are capable of formation have been formed by the time the reaction mixture is ready to leave the reactor. At the latter point, the mixture will comprise crystalline molecular complexes of straight chain organic compounds with urea, diluent, aqueous urea solution and the residual fractions of the original organic compound mixture which have not been affected by urea under the conditions of the treatment. At this point, it will be noted that unless the reaction mixture has been modified in accordance with the present invention, it will inherently entail subsequent processing difficulties. These are due to the emulsification (and possible development of thixotropic properties) in the various subsequent stages, such as those where the aqueous urea phase is in contact with the oleophilic phase, whether the latter be the raffinate or the extract or solvent.

The reaction mixture is next passed to a separating zone which ordinarily comprises a settling zone, centrifuge or filter. The purpose of this step is to isolate or to effect relative separation or concentration of the crystalline molecular complex from the unaffected portions of the original mixture of organic compounds. If the reaction mixture is in the form of an emulsion at this point, separation of the crystals is difficult and often substantially impossible, particularly when such separation is effected by decantation. It is necessary to break the emulsion or to devise some other means for separating the mixture into its components. If the aqueous phase of the reaction mixture has been modified as described hereinafter, emulsification will be suppressed. It is then possible to obtain a substantial separation of the liquid phases from the crystals by decantation, filtration or centrifuging. It is usually unnecessary to separate the crystals from the aqueous phase since regeneration may be carried out in its presence: therefore, the separation may be purposely restricted to the separation of only the non-aqueous phase.

When the crystalline complexes have been separated from the remaining unaffected organic compounds (hereinafter called the raffinate) the next step is to regenerate the reacted, e. g. straight chain, organic compounds therefrom.

The crystalline complexes may be decomposed by several alternative methods. A preferred process comprises heating the complexes in the dilute aqueous urea previously employed in the treatment of the original mixture of organic compounds. The products are heated to such temperature as is required to dissociate the complex, and normally substantially above the reaction temperature, e. g. about 25° C. above the reaction temperature. If temperatures of about 32-65° C. are applied under these conditions to the slurry, the complexes decompose to yield urea and straight-chain organic compounds. This results in the reforming of a concentrated urea solution and in the isolation of highly pure straight-chain organic materials. The utility of the demulsifiers is evident at this point. Other means for regenerating straight-chain substances from their complexes comprise steam distillation, dry heating, heating with a dry gas such as nitrogen, and heating in the presence of a relatively high-boiling solvent for the straight-chain organic compounds.

Having separated the straight chain materials from the non-straight chain materials, further treatment of the fractions is optional. Such treatments may include acid treatment, decolorizing by clay adsorption, fractional distillation and so on.

The urea solution

According to the process of the present invention, it is essential to employ an aqueous solution of urea modified by the presence of the agents detailed below. While the solvent is essentially aqueous, it may include modifying ingredients, such as water-soluble alcohols or water-soluble ketones, as long as they are substantially inert toward urea under the conditions employed for the fractionation. Hence, ethyl alcohol or acetone may be used in amounts up to about 50% of the aqueous urea solution.

It is preferred practice to use and maintain the highest concentration of urea possible under the conditions, such as temperature, used during fractionation. For example, at about 30° C. a saturated aqueous urea solution will contain approximately 50% by weight of urea. Saturation of the aqueous solution may be maintained by continuous or intermittent addition of urea during the fractionation or by gradual decrease in the temperature of the reaction mixture. It is preferred practice to employ a large excess of the urea solution over that which will be consumed during complex formation so that at no place in the reaction system will the urea solution become seriously depleted in concentration. An alternative practice comprises substituting thiourea in place of urea. In this case, a different type of fractionation results. Thiourea has been found to form crystalline molecular complexes with branched chain and cycloaliphatic organic compounds, but is inert toward straight chain or aromatic compounds.

As outlined hereinbefore, the essence of the present invention comprises the addition to the aqueous urea solution of a water-soluble salt for the purpose of suppressing emulsification between the oleophilic phase containing the mixture of organic compounds and the aqueous phase containing dissolved urea. The salts itemized below must be employed in amounts equivalent to 0.1% by wt. of the aqueous phase for significant suppression of emulsions in the reaction mixtures described in the foregoing section. It has not been found necessary to use more than about 5% by weight of the subject salts for emulsion suppression, and ordinarily 0.5–2.5% has been found to be the preferred concentration range.

The preferred class of emulsion suppressor comprises water-soluble nitrites and preferably the alkali metal nitrites. Water-soluble organic nitrites also are effective. Sodium, potassium or lithium nitrite are preferred. Organic nitrites which may be used include especially the nitrite salts of an organic nitrogen-base compound. More particularly these organic nitrites comprise diamine nitrites such as dicyclohexylamine nitrite, diisopropylamine nitrite, piperazine nitrite as well as primary and tertiary amine nitrites such as morpholine nitrite and tri-tertiary-butylamine nitrite. The organic nitrites which are effective are those which are substantially water-soluble and which have a low vapor pressure under the temperature and pressure conditions of the extraction. Nitrites of quaternary ammonium bases such as tri-methyl-benzyl ammonium nitrite also are suitable.

A second class of effective emulsion suppressers comprises water-soluble chromates corresponding to the nitrite salts detailed above. The preferred group includes the alkali metal chromates, but the organic chromates, and especially the secondary amine chromates, also are effective. Ammonium chromate is a preferred species, together with its quaternary ammonium chromate homologs, such as tetra ethyl ammonium chromate. Dicyclohexylamine chromate, sodium dichromate and sodium chromate are effective emulsion suppressers as well.

As the third class, the water-soluble iodates, and especially the alkali metal iodates such as sodium and potassium iodate, as well as ammonium iodate, are effective for breaking emulsions in the urea fractionation process. Iodates of amines such as those itemized above also are effective. Of this group, dicyclohexylamine iodate is preferred.

The salts may be dissolved in water either prior or subsequent to the addition of urea. Since some of the salts, e. g. nitrites, described above tend to decompose slowly at pH's below 6, it is preferred practice to maintain the pH of the solution at a figure above a pH 6. If water-soluble acids, which may be sulfuric, hydrochloric, acetic, etc., are employed together with the salts to aid in the de-emulsification, then in order to inhibit the above-mentioned decomposition of the salts, these acids should not be used in amounts which would lower the pH below about 6. Effectiveness of these salts as corrosion inhibitors increases as the pH is increased, so that relatively smaller amounts of the salts are required at higher pH values. The upper limit of pH, on the other hand, is generally limited by considerations of crystal size and reaction rate, both of these properties being decreased with an increase in the pH. Hence, it is usually preferred to maintain the pH of the reaction mixture below about 9, and preferably below about 8.5.

Mixtures of organic compounds

Numerous types of mixtures of organic compounds may be fractionated by the described urea process. The essential qualification of such mixtures comprises the presence of an appreciable quantity, i. e. at least about 1% (preferably at least 5%) of straight-chain organic compounds in admixture with non-reactive materials, e. g. those having branched or cyclic configurations. Hydrocarbon mixtures, and especially petroleum hydrocarbon mixtures, are especially suitable for the described treatment. It has been found possible to separate straight-chain hydrocarbons from branched-chain hydrocarbons and aromatics or naphthenes by treatment with urea as described above. In the absence of the emulsion suppressers, the reaction mixture has been found difficult to process due to persistent emulsification at one or more of the several points in the process flow, as indicated above.

Other mixtures which may be treated according to the present process include mixtures of naturally occurring fatty acids such as castor oil acids, linseed oil acids, and the like, as well as their esters, etc. In this case, it has been discovered that the fractionation will occur according to the degree of saturation of the acid, since the structure thereof more nearly approaches that of a straight chain compound as the degree of saturation increases. Hence, stearic acid may be readily separated from linolenic acid by this procedure.

Other oxygen-containing compounds such as alcohols, esters, ketones and aldehydes may be treated as described above for separation according to degree of saturation or according to molecular weight and straight-chain content. In this respect, it has been found that low molecular weight complexes with urea decompose more readily than those having higher molecular weight; hence, it is possible to separate a mixture of octadecane from octane by forming crystalline molecular complexes with urea and subsequently heating above the decomposition temperature of the octane-urea complex but below the decomposition temperature of the octadecane-urea complex. Alternatively, with the same mixture, by proper choice of conditions, octadecane can be made to react selectively with urea, leaving the octane substantially unreacted.

Mixtures of halogenated compounds may be fractionated by the present process. Straight-chain organic compounds having terminal halogen atoms form urea complexes, while similar compounds having halogen substituents attached to non-terminal carbon atoms form urea complexes with considerable reluctance.

It is possible to treat normally solid or relatively viscous mixtures of organic compounds, such as hydrocarbon waxes, by dissolving the mixture in a suitable inert solvent. Preferably, the solvent is substantially immiscible with water or miscible to a minor extent only therewith. Especially preferred solvents comprise methyl ethyl ketone and methyl isobutyl ketone, although ethers such as diethylether may be used as well. Inert hydrocarbons such as cyclopentane may be employed. It is often preferred practice to employ a diluent even though the mixture being treated is normally fluid at the temperature of treatment. A solvent in this case facilitates the operations in providing a more fluid environment and assists in raising the purity of the crystalline complexes due to auxiliary washing action of the crystals.

If thiourea is the crystallizing agent employed, mixtures containing branched chain or cycloaliphatic compounds may be treated. Thiourea forms crystalline molecular complexes with branched chain hydrocarbons such as iso-octane or cycloaliphatic compounds such as cyclohexane. Other materials forming crystalline molecular complexes with thiourea are discussed in a copending patent application, Serial Number 730,182, filed February 21, 1947, now Patent 2,499,820.

In summarizing the optimum conditions under which the present process operates, it is a preferred practice to treat petroleum oils having a normal paraffin content of about 12-20% by first diluting 100 parts by weight of the oil with 50-150 parts by weight of a ketone, such as methyl isobutyl ketone, and contacting the diluted oil with 100-300 parts by weight of an aqueous solution of urea having dissolved therein a corrosion inhibitor salt such as sodium nitrite. The treatment temperature is preferably between 40-75° C., and after formation of the crystalline molecular complexes between urea and straight chain hydrocarbons, the aqueous phase is separated from the remaining liquid hydrocarbons, the amount of corrosion inhibitor present in the aqueous phase separating at this point to suppress emulsification of the hydrocarbon mixture in the aqueous phase.

The following example illustrates preferred conditions for conducting the process of the present invention.

Example

Eighteen hundred parts by weight of an aqueous urea solution, saturated at 21° C., were mixed with 300 parts by weight of straight run burner oil and an equal quantity of methyl isobutyl ketone. The ingredients were mixed by recycling through a pump at a temperature of 34° C. for 25 minutes. The reaction mixture was allowed to stand, and samples of the lower layer were withdrawn at stated intervals. These samples were centrifuged to determine the amount of emulsified non-aqueous liquid phase present therein.

The same procedure was repeated, modifying the urea solution with the various substances described in the table below. The hydrocarbon contents of the samples withdrawn are also noted in the same table.

| Substance Added to Urea Solution | Concentration, Per Cent Wt. of Solution | | pH of Final Solution | Content of Non-aqueous Phase in Lower Layer After Settling, Per Cent Vol. | | | |
|---|---|---|---|---|---|---|---|
| | Basis Substance Added | Basis Anion | | 5 Min. | 10 Min. | 20 Min. | 60 Min. |
| None | | | 8.5 | 25 | 25 | 24 | 21 |
| Ammonium Chromate | 0.65 | 0.5 | 7.8 | | 12.5 | | |
| | 1.3 | 1.0 | 7.8 | 0.20 | 0.12 | 0.05 | 0.00 |
| | 1.6 | 1.25 | 7.8 | 0.10 | 0.02 | 0.00 | |
| Sodium nitrite | 1.5 | 1.0 | 8.7 | 0.95 | 0.80 | 0.30 | 0.00 |
| Dicyclohexylamine nitrite | 1.0 | 0.2 | 7.5 | 0.28 | 0.17 | 0.00 | |
| Diammonium hydrogen phosphate | 1.4 | 1.0 | 8.5 | 1.26 | 0.84 | 0.51 | 0.17 |

The invention claimed is:

1. The process for the fractionation of petroleum oil, said oil having a normal paraffin content of about 12–20% which comprises diluting 100 parts by weight of oil with 50–150 parts of methyl isobutyl ketone, contacting the diluted oil with an aqueous phase having dissolved therein 100–300 parts by weight of urea and sodium nitrite at a temperature of 40–75° C., said contacting causing crystalline molecular complexes to form between urea and straight-chain hydrocarbons, and subsequently separating said aqueous phase from the remaining liquid hydrocarbons, the amount of sodium nitrite being at least sufficient to substantially suppress emulsification of the hydrocarbon solution in the aqueous phase.

2. The process for the separation of straight-chain hydrocarbons from a liquid mixture thereof with non-straight-chain hydrocarbons which comprises contacting said mixture with an aqueous phase having dissolved therein urea and 0.5–5% by weight of said aqueous phase of sodium nitrite, whereby crystalline molecular complexes are formed between urea and straight-chain hydrocarbons, and subsequently separating said aqueous phase from the remaining liquid hydrocarbons, the amount of said nitrite being at least sufficient to substantially suppress emulsification of the aqueous phase and the liquid hydrocarbon mixture.

3. The process for the separation of straight-chain hydrocarbons from a liquid mixture thereof with non-straight-chain hydrocarbons which comprises contacting said mixture with an aqueous phase having dissolved therein urea and 0.5–5% by weight of said aqueous phase of ammonium chromate, whereby crystalline molecular complexes are formed between urea and straight-chain hydrocarbons, and subsequently separating said aqueous phase from the remaining liquid hydrocarbons, the amount of said chromate being at least sufficient to substantially suppress emulsification of the aqueous phase and the liquid hydrocarbon mixture.

4. The process for the separation of straight-chain hydrocarbons from a liquid mixture thereof with non-straight-chain hydrocarbons which comprises contacting said mixture with an aqueous phase having dissolved therein urea and 0.5–5% by weight of said aqueous phase of sodium iodate, whereby crystalline molecular complexes are formed between urea and straight-chain hydrocarbons, and subsequently separating said aqueous phase from the remaining liquid hydrocarbons, the amount of said iodate being at least sufficient to substantially suppress emulsification of the aqueous phase and the liquid hydrocarbon mixture.

5. The process according to claim 2 wherein the concentration of sodium nitrite is 1–2.5% by weight of the aqueous phase.

6. The process for the separation of straight-chain hydrocarbons from a liquid mixture thereof with non-straight-chain hydrocarbons which comprises contacting said mixture with an aqueous phase having dissolved therein urea and an agent of the group consisting of water-soluble nitrites, iodates and chromates and mixtures thereof, whereby crystalline molecular complexes form between urea and straight-chain hydrocarbons, and subsequently separating said aqueous phase from the remaining liquid hydrocarbons, the amount of said agent being at least sufficient to substantially suppress the emulsification of the aqueous phase and the liquid hydrocarbon mixture.

7. The process according to claim 6 wherein the pH of the aqueous phase is between 6 and 9.

8. The process according to claim 6 wherein the pH of the aqueous phase is maintained in the range pH 6 to pH 8 by the addition of a water-soluble fatty acid.

9. The process for the separation of straight-chain organic compounds from a liquid mixture thereof with non-straight-chain organic compounds which comprises contacting said mixture with an aqueous phase having dissolved therein urea and an agent of the group consisting of water-soluble nitrites, iodates and chromates and mixtures thereof, whereby crystalline molecular complexes form between urea and straight-chain organic compounds, and subsequently separating said aqueous phase from said liquid organic compounds, the amount of said agent being at least sufficient to substantially suppress the emulsification of the aqueous phase and the liquid organic compounds mixture.

10. The process for the fractionation of mixtures of hydrophobic organic compounds which comprises contacting a hydrophobic phase containing said mixture with an aqueous solution having dissolved therein a complex-forming agent of the group of urea and thiourea and in addition thereto a salt of the group consisting of water-soluble nitrites, iodates and chromates and mixtures thereof, whereby crystalline complexes form between said agent and a fraction of the hydrophobic mixture, and subsequently separating said aqueous solution from liquid hydrophobic organic compounds, the amount of water-soluble salt being at least sufficient to substantially suppress the emulsification of the hydrophobic phase and the aqueous solution.

11. The process for the fractionation of petroleum oil, said oil having a normal paraffin content of about 12–20% which comprises diluting 100 parts by weight of oil with 50–150 parts of methyl isobutyl ketone, contacting the diluted oil with an aqueous phase having dissolved therein 100–300 parts by weight of urea and dicyclohexylamine nitrite at a temperature of 40–75° C., said contacting causing crystalline molecular complexes to form between urea and straight-chain hydrocarbons, and subsequently separating said aqueous phase from the remaining liquid hydrocarbons, the amount of dicyclohexylamine nitrite being at least sufficient to substantially suppress emulsification of the hydrocarbon solution in the aqueous phase.

12. The process for the fractionation of mixtures of hydrophobic fatty acids which comprises contacting a hydrophobic phase containing said mixture with an aqueous solution having urea dissolved therein and in addition thereto a salt of the group consisting of water-soluble nitrites, iodates and chromates and mixtures thereof, whereby crystalline complexes form between urea and a fraction of the acids, and subsequently separating said aqueous solution from liquid hydrophobic acids, the amount of the water-soluble salt being at least sufficient to substantially suppress the emulsification of the hydrophobic phase and the aqueous solution.

13. The process for the fractionation of mixtures of hydrophobic organic compounds which comprises contacting a hydrophobic phase containing said mixtures with an aqueous solution having dissolved therein a complex forming agent of the group consisting of urea and thiourea and in addition thereto a water-soluble alkali metal nitrite, whereby crystalline complexes form between said agent and a fraction of the hydrophobic mixture, and subsequently separating said aqueous solution from liquid hydrophobic organic compounds, the amount of water-soluble nitrite being at least sufficient to substantially suppress the emulsification of the hydrophobic phase and the aqueous solution.

14. The process for the fractionation of mixtures of hydrophobic organic compounds which comprises contacting a hydrophobic phase containing said mixtures with an aqueous solution having dissolved therein a complex forming agent of the group consisting of urea and thiourea and in addition thereto a water-soluble diamine nitrite, whereby crystalline complexes form between said agent and a fraction of the hydrophobic mixture, and subsequently separating said aqueous solution from liquid hydrophobic organic compounds, the amount of water-soluble diamine nitrite being at least sufficient to substantially suppress the emulsification of the hydrophobic phase and the aqueous solution.

RICHARD E. MELROSE.

REFERENCES CITED

The following references are of record in the file of this patent:

UNITED STATES PATENTS

| Number | Name | Date |
| --- | --- | --- |
| 1,891,987 | Jennings et al. | Dec. 27, 1932 |
| 2,305,549 | Nixon | Dec. 15, 1942 |

OTHER REFERENCES

Technical Oil Mission, reel 143, 6 pages translation of German patent application No. B190,197, deposited in the Library of Congress, May 22, 1946.